Patented Feb. 9, 1937

2,070,523

UNITED STATES PATENT OFFICE 2,070,523

PROCESS OF PREPARING THIAZYL DERIVATIVES

Albert M. Clifford, Stow, Ohio, assignor to Wingfoot Corporation, Wilmington, Del., a corporation of Delaware No Drawing. Application March 23, 1935
Serial No. 12,743

16 Claims. (Cl. 260—44)

This invention relates to a new process of preparing a class of compounds which may be called alkylene thiazyl 1-thio hydrins. They find use as accelerators of the vulcanization of rubber when employed in conjunction with a basic nitrogen-containing accelerator. The compounds are, more particularly, derivatives of mercaptothiazoles and are prepared by reacting a mercaptothiazole, preferably in alkaline solution, with an alkylene halogen hydrin. The products may be represented by the type formula B—S—R—OH wherein B is a 1-thiazyl radical and R is an alkylene radical. A preferred class of the compounds prepared by the practice of the invention are those illustrated by the following formula:

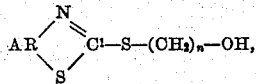

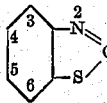

wherein AR is an ortho arylene radical of the benzene and naphthalene series and $n$ is an integer between one and six.

The process is preferably carried out by reacting in solution an alkali metal salt of a 1-mercaptothiazole with an alkylene halogen hydrin. Generally, it will be desirable to reflux the materials for perhaps an hour in order to complete the reaction between the materials, although this may not be necessary in all cases. Various solvents may be employed, alcohol, acetone, water and benzene and mixtures of such having been found suitable.

Further illustrative of the invention is the preparation of ethylene benzothiazyl 1-thio hydrin. It may be prepared by warming 167 grams (1 mol) of mercaptobenzothiazole and 40 grams of NaOH in 550 cc. of ethyl alcohol and thereafter filtering the resulting solution through filtercel and boneblack to remove impurities. The filtered solution is maintained at 40–50° C. and 80 grams (1 mol) of ethylene chlorohydrin added thereto. The mixture becomes warm and finally boils during which large quantities of NaCl form. The mixture is refluxed for one hour and the salt filtered off. The main product, ethylene benzothiazyl 1-thio hydrin, is obtained as an oil from the alcoholic filtrate by distilling off the solvent and pouring into water. After washing and drying in a vacuum desiccator over H2SO4, the oil, pale yellow in color, is obtained in a yield of 155 grams. It was found to contain on analysis an average nitrogen content of 6.27% and an average sulphur content of 29.95% as compared with the theoretical nitrogen and sulphur contents of ethylene benzothiazyl 1-thio hydrin of 6.63% and 30.3%, respectively. A portion of the product freed from low boiling impurities by heating for 1½ hours at 110° C. and 50 mm. possessed a specific gravity of 1.330 at 25° C. and 1.340 at 20° C. The reaction is believed to be expressed by the following equation:

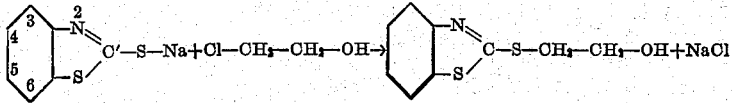

n-propylene benzothiazyl 1-thio hydrin may be prepared similarly by heating at a temperature ranging from 65 to 85° C. for forty-five minutes a solution of 1.05 mols of the sodium salt of 1-mercaptobenzothiazole and 139 grams trimethylene bromo hydrin in 300 cc. of water and 200 cc. of acetone. A yellow oil forms. This product, n-propylene benzothiazyl 1-thio hydrin, after being separated, washed with water and dried by heating to 110° C. at 5–10 mm. is obtained in a yield of 229.3 grams and in the form of an orange-red oil. It has a specific gravity of approximately 1.30 at a temperature of 25° C. and on analysis is found to contain an average nitrogen content of 6.10% and an average sulphur content of 27.95% as compared with the respective theoretical nitrogen and sulphur contents of n-propylene benzothiazyl 1-thio hydrin of 6.23% and 28.50%. The equation representing the reaction is believed to be as follows:

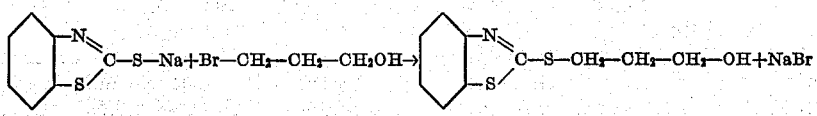

Methylene benzothiazyl 1-thio hydrin may be prepared by cooling to 10° C. a solution of 37.8 grams of anhydrous sodium mercaptobenzothiazole in 500 cc. of dry benzene and adding thereto with stirring a cold solution of methylene bromo hydrin in 100 cc. of benzene. The mixture is permitted to stand for 45 minutes after which the resulting sodium bromide is filtered off. The filtrate is allowed to evaporate in the air after which the material remaining is dried in vacuum over $H_2SO_4$. The product, slightly impure methylene benzothiazyl 1-thio hydrin, is a viscous liquid which solidifies after standing a day. After repeated extractions with alcohol at 25° C., there is obtained practically pure methylene benzothiazyl 1-thio hydrin, a colorless solid which melts at 121–125° C. The equation representing the reaction is as follows:

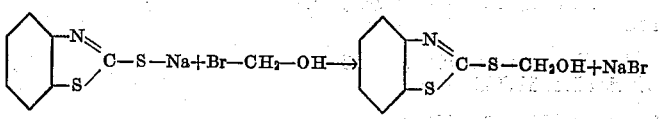

It will be understood that the examples specifically described herein while illustrative of the invention are not limitative thereof and that the process can be employed generally in preparing alkylene thiazyl 1-thio hydrins. Thus, other alkylene halogen hydrins which may be employed are tetra methylene bromo hydrin, beta brom n-propyl alcohol, hexa methylene chloro hydrin, 3-bromo pentanol-1, beta bromo diethyl carbinol, 3-chloro butanol-1 and hepta methylene bromo hydrin. Similarly, any soluble alkaline salt of a 1-mercaptothiazole may be employed in the practice of the invention. Illustrative of the free mercaptothiazoles are the 1-mercapto arylene thiazoles of the benzene and naphthalene series, such as 1-mercapto 4-nitro benzothiazole, 1-mercapto 5-nitro benzothiazole, 1-mercapto 3-phenyl benzothiazole, 1-mercapto 4-chlor benzothiazole, 1-mercapto 5-chlor benzothiazole, 1-mercapto 3-methyl benzothiazole, 1-mercapto 6-methyl benzothiazole, 1-mercapto 3-hydroxy benzothiazole, 1-mercapto 5-amino benzothiazole, 1-mercapto 5-ethoxy benzothiazole, 1-mercapto 4-methoxy benzothiazole, 1-mercapto alpha naphthathiazole, 1-mercapto beta naphthathiazole, the 1-mercapto tolyl and xylyl thiazoles, etc. Other 1-mercaptothiazoles are 1-mercaptothiazole, 1-mercapto 3-methyl thiazole, 1-mercapto 3-phenyl thiazole, 1-mercapto 3-4-dimethyl thiazole, 1-mercapto 3-ethyl thiazole and the like.

As previously stated, the mercaptothiazoles should be employed in the form of a soluble alkaline salt such as the sodium, potassium, lithium, ammonium and calcium.

It will also be understood that various conditions of the process may be varied. While it is to be understood that generally the reactants are reacted in solution and are preferably heated under reflux, it will be understood that these conditions are not necessary in all cases. Furthermore, while the brom and chlor alkylene hydrins have been described as illustrative, it will be understood that the iodo alkylene hydrins may also be employed.

It will be apparent that by this invention a valuable new process has been provided. Furthermore, the products of the process are new in and of themselves except for methylene benzothiazyl 1-thio hydrin. It is intended that the patent shall cover, by suitable expression in the appended claims, whatever features of patentable novelty reside in the invention.

What I claim is:

1. A process of preparing ethylene benzothiazyl 1-thio hydrin which comprises reacting a soluble alkaline salt of a 1-mercaptobenzothiazole with an ethylene halogen hydrin.

2. A process of preparing ethylene benzothiazyl 1-thio hydrin which comprises refluxing a solution of an alkali metal salt of 1-mercaptobenzothiazole and ethylene chloro hydrin.

3. The process of preparing methylene benzothiazyl 1-thio hydrin which comprises reacting a soluble alkaline salt of 1-mercaptobenzothiazole with methylene halogen hydrin.

4. The process of preparing an ethylene thiazyl 1-thio hydrin which comprises reacting a soluble alkaline salt of a 1-mercaptothiazole with an ethylene halogen hydrin.

5. The process of preparing an alkylene benzothiazyl 1-thio hydrin which comprises reacting a water-soluble alkali-forming salt of a 1-mercaptobenzothiazole with an alkylene halogen hydrin.

6. The process of preparing an alkylene benzothiazyl 1-thio hydrin which comprises heating a solution of an alkali metal salt of 1-mercaptobenzothiazole and an alkylene halogen hydrin for a period sufficient for the formation of a practically quantitative yield of alkylene benzothiazyl 1-thio hydrin.

7. The process of preparing compounds having the type formula

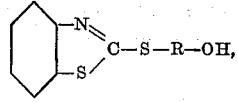

wherein R is an alkylene radical which comprises reacting in alkaline solution a 1-mercaptobenzothiazole and an alkylene halogen hydrin.

8. The process of preparing compounds having the type formula

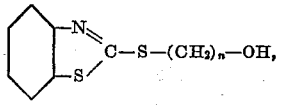

wherein $n$ is an integer between one and six, which comprises reacting under reflux an alkylene halogen hydrin containing not more than six methylene radicals with a solution of an alkali metal salt of 1-mercaptobenzothiazole.

9. The process of preparing compounds having the formula

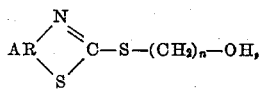

wherein AR is an ortho arylene of the benzene and naphthalene series and $n$ is an integer between one and six, which comprises reacting an alkaline salt of a 1-mercaptothiazole of the benzene and naphthalene series with a methylene halogen hydrin having not more than six methylene groups.

10. A process of preparing compounds having the type formula B—S—R—OH wherein B is a 1-thiazyl radical and R is an alkylene radical, which comprises reacting an alkaline salt of a 1-mercaptothiazole with an alkylene halogen hydrin.

11. Ethylene benzothiazyl 1-thio hydrin.

12. n-propylene benzothiazyl 1-thio hydrin.

13. An alkylene benzothiazyl 1-thio hydrin in which the alkylene radical contains at least two carbon atoms.

14. An alkylene thiazyl 1-thio hydrin in which the alkylene radical contains at least two carbon atoms.

15. The compounds represented by the type formula B—S—R—OH wherein B is a 1-thiazyl radical and R is an alkylene radical containing at least two carbon atoms.

16. The compounds represented by the type formula

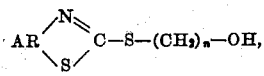

wherein AR is an ortho arylene radical of the benzene and naphthalene series and $n$ is an integer between two and six, inclusive.

ALBERT M. CLIFFORD.